United States Patent Office 3,415,609
Patented Dec. 10, 1968

3,415,609
METHOD FOR FIXING DYES ON TEXTILE FIBERS AND TEXTILE FIBERS RESULTING FROM METHOD
Charles D. Weston, Charlotte, N.C., assignor to Martin-Marietta Corporation, a corporation of Maryland
No Drawing. Filed Apr. 26, 1965, Ser. No. 451,015
6 Claims. (Cl. 8—34)

ABSTRACT OF THE DISCLOSURE

Method for fixing dyes on textile fibers comprising the step of contacting an acid free aqueous fixing solution comprising water and a polythionate of the formula $X—O_3S—(S)_n—SO_3—X$, wherein X is a member selected from the group consisting of Na, K and $NH_4$ and $n$ is a whole number from 1–4 inclusive, with a textile fiber having thereon at least one dyestuff in reduced form, said dyestuff being selected from the group consisting of (i) dyes which in their reduced form have at least one pendant mercaptide group per molecule of dye and (ii) dyes which in their reduced form have at least one pendant mercapto group per molecule of dye. Also textile fibers on which dye has been fixed according to the method.

---

The present invention relates to a method for fixing dyes on textile fibers, and to textile fibers which have been processed according to the present method.

The method of the present invention is particularly characterized in being a method for fixing dyes on textile fibers comprising the step of contacting an acid free aqueous fixing solution comprising water and a polythionate of the formula $X—O_3S—(S)_n—SO_3—X$, wherein X is a member selected from the group consisting of Na, K and $NH_4$ and $n$ is a whole number from 1–4 inclusive, with a textile fiber having thereon at least one dyestuff in reduced form, said dyestuff being selected from the group consisting of (i) dyes which in their reduced form have at least one pendant mercaptide group per molecule of dye and (ii) dyes which in their reduced form have at least one pendant mercapto group per molecule of dye.

The product of the present invention is particularly characterized in comprising textile fibers on which dye has been fixed according to the above method.

Textile fibers on which color may be fixed according to the method of the present invention include, without limitation thereto, cotton, regenerated cellulose, polyacrylic and polyamide. The textile fibers may be in any desired form, such as fabric, yarn, ball warps, non-woven fabric, raw stock, etc.

Illustrative and non-limiting examples of dyes which may be fixed according to the method of the present invention follow. When in reduced form these dyes have at least one pendant mercaptide or pendant mercapto group per molecule of dye. They are:

(a) Sulfur dyes, including indophenol sulfurized dyes, pre-reduced liquid sulfur dyes, and thiosulfuric acid derivatives of sulfur dyes;
 (b) Azo dyes having a disulfide group in the molecule, or having at least one pendant thiosulfato group or pendant —SCN group per molecule of dye;
 (c) Phthalocyanine or metal phthalocyanine dyes having a disulfide group in the molecule, or having at least one pendant thiosulfato or pendant —SCN group per molecule of dye;
 (d) Perylene dyes having at least one pendant —SCN group per molecule of dye; and
 (e) Anthroquinone dyes having at least one pendant mercapto or mercaptide group per molecule of dye when the dye is in reduced form.

It will be understood that those of the above listed dyes which are in their oxidized form will, in the operation of the present process, be in their reduced form on the fiber at the time of initial contact with the fixing solution.

If desired, the fibers may be dyed with a mixture of the above dyes, for example a mixture of sulfur dye and azo dye having a pendant thiosulfate group.

A more detailed description of the process of the present invention follows.

The present process may be used in dyeing or printing textile fibers. The dyestuff may be applied to the fibers in any desired manner, such as by jig, pad, beck, printing roller, etc. The dyestuff may be applied to the fibers either in reduced form or in oxidized form; in the latter case the dyestuff will be converted to its mercapto or mercaptide form prior to its contact with the fixing solution. It will be understood that dyes having a pendant thiosulfato or pendant —SCN group may be converted to their mercapto form by hydrolysis under acid or alkaline conditions, as well as by reduction.

If desired, the fibers may optionally be batched for a period of time, steamed or dried to facilitate penetration of the dyestuff into the fibers, or to assist in reducing oxidized dye.

The fibers having thereon the dyestuff in reduced form are then contacted with the fixing solution to fix the dyestuff, such as by immersing the fibers in the fixing solution.

The fixing solution comprises an acid free aqueous solution of a polythionate of the formula

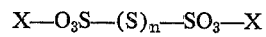

$$X—O_3S—(S)_n—SO_3—X$$

wherein X is a member selected from the group consisting of Na, K and $NH_4$ and $n$ is a whole number from 1–4 inclusive. The fixing solution may optionally contain a simple electrolyte, such as NaCl, which serves to deter those dyestuffs which tend to bleed from the fibers into the fixing solution from doing so. It is advantageous to use an electrolyte with the less substantive azo dyes, although not required. Fixing solutions comprising, by weight, 0.1–20% of the polythionate, 0–30% sodium chloride, and 50–99.9% water have been found suitable for use in the present method.

The fixing solution may be at about 35°–200° F. and preferably at room (ambient) temperature for reasons of economy, and no particular advantage is associated with having the fixing solution at other than room temperature. At room temperature, the fixing reaction proceeds rapidly, and is complete when the dyestuff and fixing solution have been in contact for about 5–60 seconds, usually about 30 seconds is convenient in continuous processing.

Illustrative examples of polythionates suitable for use in the present invention include the disodium, dipotassium and diammonium salts of trithionic acid, tetrathionic acid, pentathionic acid and hexathionic acid.

After fixation of the dyestuff the fibers may be washed and dried in conventional manner.

Dyeings and prints having excellent wash fastness may be prepared according to the present invention.

The method of the present invention has a number of advantages over the prior art, some of which follow.

Dyeings made from sulfur dyes according to the present method have better wash fastness, are more easily rewettable, and are less harsh to the touch than when the dye is fixed by direct oxidation with conventional chrome and acid.

When sulfur dyes are fixed by the present method, there is not interference with subsequent finishing steps, such as resination and water repellency treatments. This provides a marked advantage over present commercial methods of fixing sulfur dyes with chrome and acid in which there is interference with subsequent resination and water repellency treatments. For example, when chrome and acid is used, the fabric will not absorb enough of the water repelling chemical to give the commercially required spray rating unless a large amount of expensive rewetting agent is used. Rewetting agent is not required in connection with water repellency treatments of fabrics which have been dyed with sulfur dyes according to the method of the present invention.

In prior art systems for applying sulfide reducible dyes by the reduction-oxidation technique, dealing with excess sulfides and alkali used for the dye reduction has presented troublesome problems. For example, present practice is to attempt to wash excess sulfides and alkali completely from the fibers prior to their entering the oxidizing bath, which practice has the problems of color loss because of washing the soluble leuco, incompleteness of washings, and production of a sulfide effluent having a bad odor and giving rise to a disposal problem. When the excess sulfides and alkali are not removed or are removed incompletely from the fibers prior to their entry into the acid oxidizing bath, several disadvantageous consequences result, for example hydrogen sulfide gas, which is dangerous and has an unpleasant odor, is evolved; sulfide reduces the oxidizing agent and diminishes its effectiveness; and alkali neutralizes the acid, causing the chromate to diminish in oxidizing power. According to the method of the present invention, the above disadvantages and limitations are overcome, as the present fixing solution not only fixes the dyestuff onto the fibers but also simultaneously reacts rapidly with excess sulfides and absorbs excess caustic alkalinity, all without any requirement for washing excess sulfides alkali and reducing agent from the fibers prior to their entry into the fixing bath. Moreover, $H_2S$ is not evolved and the present fixing bath does not discharge an offensive odor. Thus, problems involving atmospheric and stream pollution are improved, and economic and technical advantages realized.

The elimination of the requirement for washing excess sulfides and alkali from textile fibers prior to their entry into the fixing bath is of particular importance in connection with applying those dyes which have poor substantivity for the fibers in their mercapto form, such as most of the azo dyes having at least one pendant mercapto group, as elimination of the washing step now prevents their being washed off the fibers prior to fixation. However, in connection with dyes which have good substantivity for textile fibers in their reduced form, such as most of the sulfur dyes, it is suggested that the washing step be employed as hitherto or else that very little more alkali and sulfide be employed than is necessary to solubilize the dye to avoid use of excess polythionate in the fixing bath.

The following are illustrative examples. All parts and percentages are by weight unless otherwise indicated.

EXAMPLE 1

To cotton fabric is applied by padding a reduced dye solution at 150° F. consisting of 20 oz. "Sodyesul" Liquid Black 4GCF (Sulfur Black 1, C.I. No. 53185) per gallon of water, whereafter the fabric is squeezed to permit 60% wet pick-up based on fabric weight, steamed at 230° F. for 1 minute, passed through three wash boxes containing water and equipped with nip rolls, immersed in a fixing solution consisting of 1% aqueous disodium tetrathionate 1 minute at room temperature, washed and dried. A black dyeing having excellent fastness to washing processes is obtained.

EXAMPLE 2

A Gaston County yarn dyeing machine is loaded with cotton yarn. The yarn is boiled off in conventional manner with 1% acetic acid and 2% sulfonate wetting agent by running 30 minutes at 200° F.; the bath is dumped and the machine is recharged with 1% ethylene diamine tetra acetic acid type chelating agent and 1% sodium sulfide; the machine is run 10 minutes at 120° F., whereafter there is added to the machine and to the above solution 15% "Sodyesul" Liquid Yellow ECF (Sulfur Yellow 4, C.I. 53160) in 4 parts over 20 minutes at 120° F. The temperature is then raised to 160° F. at which time 40% sodium chloride is added in 4 parts over 20 minutes. The machine is run an additional 30 minutes at 160° F. Without dropping the bath, overflow washes using water at 90° F. are given with circulation through the yarn package in the outside-in direction until the overflow is clear. The pump direction is then reversed and washing continued with an inside-out direction until the overflow is clear. The drain is then closed and a circulating wash at 120° F. is given for 10 minutes. The bath is dropped, the machine refilled with water at 120° F. to which is added 1% dipotassium trithionate which is run for 10 minutes at 120° F. This bath is then dumped and the machine refilled with water at 180° F. to which is added a 0.5% tetrasodium pyrophosphate and 1% synthetic detergent which is run for 10 minutes at 180° F. The bath is dropped and the yarn is given a running rinse until clear.

All the percentages given above in this example are based on the weight of the cotton fiber being dyed. The ratio of solution to fiber is 10:1 by weight. All of the chemicals given above are added to water to form aqueous solutions. It will be understood that the concentration of the dipotassium trithionate is 0.1% in aqueous solution in the above fixing bath.

A yellow yarn with excellent wash fastness results.

EXAMPLE 3

This example is the same as Example 1 above except that 20 oz. "Sodyesul" Liquid Golden Yellow MCF (Sulfur Yellow 2, C.I. No. 53120) per gallon of water is utilized as the dye, and except that a 1% aqueous solution of diammonium pentathionate is substituted for the fixing solution. A yellow dyeing having excellent wash fastness and improved brightness over chrome and acid fixation results.

EXAMPLE 4

Onto cotton fabric is padded a dye composition consisting of 6 oz. "Sodyesul" Black R (Sulfur Black 1, C.I. No. 53185), which has been reduced with sodium sulfide and 20 oz. urea per gallon of water; the fabric is dried, padded with a 20% gaseous solution of disodium trithionate at room temperature, washed and dried. A black dyeing with excellent wash fastness properties results.

EXAMPLE 5

This example is the same as Example 1 above, except that 24 oz. "Sodyesul" Liquid Blue 8RCF (Sulfur Blue 7, C.I. No. 53440) per gallon of water is utilized as the dye, and also except that dipotassium tetrathionate is substituted for the disodium tetrathionate used in Example 1. A blue dyeing having excellent wash fastness properties results.

EXAMPLE 6

Onto polyamide fabric is padded at 120° F. a dye composition consisting per gallon of water of 20 oz. "Hydrosol" Yellow RR (C.I. Solubilised Sulfur Yellow 2, C.I. No. 53121), which has been reduced with sodium sulfide; the fabric is dried, padded with 3% ammonium hexathionate at room temperature, steamed for 1 minute at 230° F., washed and dried. A yellow dyeing with excellent wash fastness properties results.

EXAMPLE 7

Onto viscose rayon fabric is padded at 120° F. a reduced dye composition prepared from 24 oz. "Hydrosol" Black B (C.I. Solubilised Sulfur Black 1, C.I. No. 53186) and 5 oz. sodium sulfide per gallon of water;

the fabric is squeezed to permit 60% wet pick-up immersed 1 minute in a 1% aqueous solution of disodium pentathionate (liquor to goods ratio 30:1) at room temperature, washed and dried. A black dyeing of excellent wash fastness properties results.

EXAMPLE 8

Onto cotton fabric is padded at 100° F. a reduced dye composition prepared from 2 oz. sodium sulfide reducing agent and 4 oz. of the dyestuff formed by coupling a molecular proportion of tetrazotized 4,4'-diaminodiphenyldisulfide and two molecular proportions of 1-phenyl-3-methyl-5-pyrazolone, per gallon of water; the fabric is squeezed, dried, immersed 30 seconds into an aqueous fixing solution consisting of 10% NaCl and 1% dipotassium hexathionate at 160° F. (liquor to goods ratio 30:1), washed and dried. A bright yellow dyeing with excellent wash fastness results.

EXAMPLE 9

Onto cotton fabric is padded at 140° F. a reduced dye composition prepared from 2 oz. sodium sulfide and 3 oz. of the dyestuff formed by coupling one molecular proportion of tetrazotized 4,4-diaminodiphenyldisulfide and two molecular proportions of 1(4-chlorophenyl)-3-methyl-5-pyrazolone, per gallon of water; the fabric is squeezed, dried, immersed into an aqueous fixing solution consisting of 30% NaCl and 2% diammonium trithionate at room temperature, washed and dried. A bright yellow dyeing with excellent wash fastness results.

EXAMPLE 10

Onto cotton fabric is padded at 140° F. a reduced dye composition prepared from 2 oz. sodium sulfide and 3 oz. of the dyestuff formed by coupling a molecular proportion of tetrazotized 4,4'-diamino-2,2'-dichlorodipenyldisulfide and two molecular proportions of 5'-chloro-3-hydroxy-2',4'-dimethoxy - 2 - naphthanilide, per gallon of water; the fabric is squeezed, dried, padded with an aqueous fixing solution consisting of 20% NaCl and 5% disodium hexathionate at room temperature, passed through the air for 15 seconds, washed and dried. A red dyeing with excellent wash fastness results.

EXAMPLE 11

Onto cotton fabric is padded at 100° F. a reduced dye composition prepared from 2 oz. sodium sulfide and 4 oz. of the dyestuff formed by coupling a molecular proportion of tetrazotized 4,4'-diamino-3,3'-dimethoxydiphenyldisulfide and two molecular proportions of 1-phenyl-3-methyl-5-pyrazolone, per gallon of water; the fabric is squeezed, dried, padded at room temperature with a fixing composition consisting of 25% NaCl and 7.5% dipotassium pentationate, passed through the air for 30 seconds, washed and dried. A bright orange dyeing of excellent wash fastness results.

EXAMPLE 12

Onto cotton fabric is padded at 120° F. a reduced dye composition prepared from 2 oz. sodium sulfide and 3 oz. of the dyestuff formed by coupling equimolar amounts of diazotized S-4-aminophenylthiosulfuric acid and 1-phenyl-3-methyl-5-pyrazolone, per gallon of water; the fabric is squeezed to permit 60% wet pick-up, batched in a wet roll for 30 minutes, immersed in an aqueous fixing composition consisting of 20% NaCl and 1% diammonium tetrathionate at room temperature (liquor to goods ratio 5:1), washed and dried. A bright yellow dyeing with good wash fastness results.

EXAMPLE 13

1.5 oz. of

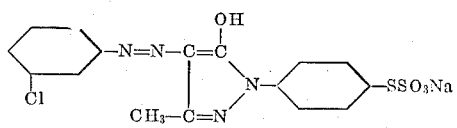

is reduced by 6.7 oz. thiourea and 3 oz. NaOH, per gallon of water, at 140° F. The reduced dye composition is padded onto polyacrylic fiber at 160° F.; the fabric is squeezed, dried, steamed at 230° F. for 1 minute in air free steam, immersed 1 minute in an aqueous fixing solution consisting of 5% NaCl and 5% disodium tetrathionate at room temperature, washed and dried. A bright yellow dyeing with good wash fastness results.

EXAMPLE 14

Onto cotton fabric is printed a printing paste consisting of by weight, 5%

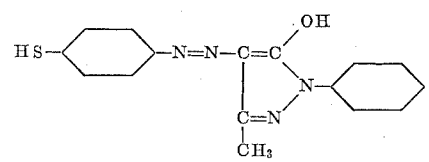

10% urea, 2.5% thiourea, 16% etherized locust beam gum, 1% emulsifier, 40% "Varsol" petroleum solvent, and 25.5% water; the fabric is dried, immersed for 45 seconds in a fixing solution consisting of 10 gms. disodium tetrathionate and 200 gms. NaCl per liter of water at room temperature, squeezed, rinsed with water, soaped, rinsed with water and dried. A yellow print with excellent wash fastness is obtained.

EXAMPLE 15

5 oz. of the dyestuff which has been prepared by coupling equimolar proportions of diazotized S-4-aminophenylthiosulfuric acid and 1-phenyl-3-methyl-5-pyrazolone is reduced with 4 oz. sodium sulfide, per gallon of water. The reduced dye is applied to cotton fabric at 150° F.; the fabric is steamed for 1 minute at 230° F., immersed 30 seconds in an aqueous fixing solution consisting of 15% NaCl and 3% diammonium trithionate at room temperature, washed and dried. A yellow dyeing with excellent wash fastness results.

EXAMPLE 16

15 oz. of the dyestuff prepared by coupling one molecular proportion of diazotized sodium S-4-aminophenylthiosulfate and one molecular proportion of 8-amino-2-naphthol, and coupling one molecular proportion of the result and one molecular proportion of diazotized sodium S-4-aminophenylthiosulfate is reduced with 4 oz. aqueous sodium sulfide, per gallon of water. Cotton fabric is padded with the reduced dye composition at 90° F.; the fabric is squeezed to permit 60% wet pick-up, dried, padded at room temperature with an aqueous fixing composition consisting of 20% NaCl and 6.5% disodium pentathionate, passed through air for 20 seconds, washed and dried. A black dye with excellent wash fastness results.

EXAMPLES 17–23

In the examples given in the following table, dyeings are made by reducing the dye shown in the second column with 4% aqueous sodium sulfide, padding a dye composition consisting of 4 oz. of the reduced dye (calculated as solids) per gallon of water at 120° F. onto cotton fabric, squeezing to permit 60% wet pick-up, drying, steaming at 230° F. for 60 seconds, immersing for 60 seconds in an aqueous solution consisting of 20% NaCl and the percent of the polythionate indicated in the third column at room temperature, washing and drying. The resulting dyeings have very good wash fastness and are of the color shown in the fourth column.

| Ex. No. | Dye | Percent Polythionate | Color |
|---|---|---|---|
| 17 | NCS—⟨C6H4⟩—N=N—C(—C—CH3)(HO—C, N)N—⟨C6H5⟩ (pyrazolone azo structure) | 5% dipotassium tetrathionate | Yellow. |
| 18 | Result of reacting equimolar amounts of Pc[—SO2Cl]5[—SO3H]0.5 and 4,4'-diamino-2,2'-dimethyldiphenyldisulfide, wherein Pc is the radical of phthalocyanine. | 4% diammonium pentathionate | Turquoise. |
| 19 | Same as Example 18, except Pc is the radical of copper phthalocyanine | 5% disodium hexathionate | Do. |
| 20 | Result of condensing 1 mol copper phthalocyanine trisulfonyl chloride and 3 mols sodium S-4-aminophenylthiosulfate. | 4% diammonium tetrathionate | Do. |
| 21 | Result of reacting 1 mol diazotized copper tetra-(4)-aminophthalocyanine and 4 mols sodium thiocyanate. | 6% disodium trithionate | Green. |
| 22 | Same as Example 21, except that the phthalocyanine is metal free | 6% dipotassium pentathionate | Do. |
| 23 | ⟨C6H5⟩—N(perylene diimide)—N—⟨C6H5⟩ with SCN substituents (perylene bis(imide) with SCN groups) | 4% diammonium hexathionate | Red. |

EXAMPLE 24

Onto cotton fabric is padded at 120° F. at a concentration of 4 oz. per gallon of water (calculated as solids) the dye formed by reacting 2 molecular proportions of 1,4-diaminoanthraquinone and 1 molecular proportion cyanuric chloride, reacting 1 molecular proportion of the result and 1 molecular proportion aniline, reacting one molecular portion of the result and 2 molecular proportions cyanuric chloride, reacting 1 molecular proprotion of the result and 4 molecular proportions of thiourea, and hydrolyzing with water to the free mercapto form. The fabric is dried, padded at room temperature with an aqueous solution of 3% disodium tetrathionate and 20% NaCl, steamed 30 seconds at 230° F., washed and dried. A violet dyeing results.

EXAMPLE 25

20 oz. "Sodyesul" Liquid Yellow ECF (Sulfur Yellow 4, C.I. No. 53160) and 2 oz.

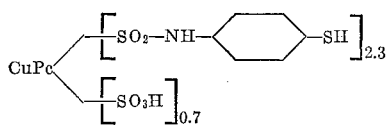

wherein CuPc is the radical of copper phthalocyanine, per gallon of water, are padded onto cotton fabric at 120° F. The fabric is steamed 1 minute at 230° F., immersed 1 minute in an aqueous fixing composition consisting of 2% disodium tetrathionate and 20% NaCl at room temperature, washed and dried. A green dyeing with excellent wash fastness results.

The above phthalocyanine dye is prepared by heating 58.7 parts 98.1% copper phthalocyanine and 379 parts chlorosulfonic acid, heating the result with 49.3 parts 98% thionyl chloride, reacting the result with 63.6 parts sodium S-4-aminophenylthiosulfate while maintaining pH 5.5–7 with Na2CO3, and hydrolyzing the dyestuff with HCl to the free mercapto form.

EXAMPLE 26

This example is the same as Example 1 above, except that the fixing solution is at 200° F.

EXAMPLE 27

This example is the same as Example 1 above, except that the fixing solution is at 35° F. and the concentration of disodium tetrathionate is increased to 10%.

What is claimed is:

1. A method for fixing dyes on textile fibers comprising the step of contacting an acid free aqueous fixing solution comprising water and a polythionate of the formula X—O3S—(S)n—SO3—X, wherein X is a member selected from the group consisting of Na, K and NH4 and $n$ is a whole number from 1–4 inclusive, with a textile fiber having thereon at least one dyestuff in reduced form, said dyestuff being selected from the group consisting of (i) dyes which in their reduced form have at least one pendant mercaptide group per molecule of dye and (ii) dyes which in their reduced form have at least one pendant mercapto group per molecule of dye.

2. A method for fixing dyes on textile fibers comprising the step of contacting an acid free aueous fixing solution comprising 50–99.9% water, 0–30% sodium chloride and 0.1–20% of a polythionate of the formula X—O3S—(S)n—SO3—X wherein X is a member selected from the group consisting of Na, K and NH4 and $n$ is a whole number from 1–4 inclusive, with a textile fiber having thereon at least one dyestuff in reduced form, said dyestuff being selected from the group consisting of (i) dyes which in their reduced form have at least one pendant mercaptide group per molecule of dye and (ii) dyes which in their reduced form have at least one pendant mercapto group per molecule of dye.

3. A method according to claim 1, and further characterized in that the temperature of the fixing solution is 35°–200° F.

4. A method according to claim 1 and further characterized in that the textile fiber is a member selected from the group consisting of cotton, regenerated cellulose, polyamide, and polyacrylic.

5. Textile fibers on which dye has been fixed according to the method of claim 1.

6. Textile fibers selected from the group consisting of cotton, regenerated cellulose, polyamide, and polyacrylic and on which dye has been fixed according to the method of claim 1.

References Cited

UNITED STATES PATENTS

| 3,113,824 | 12/1963 | Kohl et al. | 8—37 |
| 3,264,053 | 8/1966 | Holtzclaw et al. | 8—37 X |

NORMAN G. TORCHIN, *Primary Examiner.*

T. J. HERBERT, Jr., *Assistant Examiner.*

U.S. Cl. X.R.

8—37, 74, 82

UNITED STATES PATENT OFFICE
CERTIFICATE OF CORRECTION

Patent No. 3,415,609　　　　　　　　　　　　　　　　　　　December 10, 1968

Charles D. Weston

It is certified that error appears in the above identified patent and that said Letters Patent are hereby corrected as shown below:

Column 3, line 1, "not" should read -- no --.  Column 4, line 50, "gaseous" should read -- aqueous --.  Column 5, line 23, "4,4-diaminodiphenyldisulfide" should read -- 4,4'-diaminodiphenyldisulfide --; line 35, "dipenyldisulfide" should read -- diphenyldisulfide --; line 52, "pentationate" should read -- pentathionate --.  Column 6, line 23, "beam" should read -- bean --; line 47 "15" should read -- 5 --.  Column 7, Example 18, "$\pm SO_2Cl]5$" should read -- $\pm SO_2Cl]_2$ --; line 45, "proprotion" should read -- proportion --.  Column 8, line 59, "aueous" should read -- aqueous --.

Signed and sealed this 10th day of March 1970.

(SEAL)
Attest:

Edward M. Fletcher, Jr.　　　　　　　　　　　　　　WILLIAM E. SCHUYLER, JR.
Attesting Officer　　　　　　　　　　　　　　　　　　　Commissioner of Patents